United States Patent [19]

Sevrain et al.

[11] Patent Number: 5,096,390
[45] Date of Patent: Mar. 17, 1992

[54] PUMP ASSEMBLY WITH INTEGRAL ELECTRONICALLY COMMUTATED DRIVE SYSTEM

[75] Inventors: Christophe J. P. Sevrain, Vancouver, Wash.; Joseph J. Stupak, Jr., Portland, Oreg.; Kevin D. O'Hara; Kurt T. Liebezeit, both of Vancouver, Wash.

[73] Assignee: Micropump Corporation, Concord, Calif.

[21] Appl. No.: 598,217

[22] Filed: Oct. 16, 1990

[51] Int. Cl.$^5$ ............................................. F04B 17/00
[52] U.S. Cl. .................................. 417/420; 417/423.7; 310/104
[58] Field of Search ............ 417/369, 370, 410, 423.7, 417/420; 310/86, 104

[56] References Cited

U.S. PATENT DOCUMENTS

| | | | |
|---|---|---|---|
| 1,983,262 | 12/1934 | Zorzi | 310/86 |
| 2,246,777 | 6/1941 | Bordeaux et al. | 310/86 |
| 2,709,965 | 6/1955 | Litzenberg | 310/86 |
| 2,752,857 | 7/1956 | White | 310/104 |
| 3,572,982 | 3/1971 | Kozdon | 310/86 |
| 4,822,256 | 4/1989 | Laing | 310/104 |
| 4,891,537 | 1/1990 | Shiraki et al. | 310/156 |
| 4,998,032 | 3/1991 | Burgbacher | 310/156 |

Primary Examiner—Richard A. Bertsch
Assistant Examiner—David W. Scheuermann
Attorney, Agent, or Firm—Klarquist, Sparkman, Campbell, Leigh & Whinston

[57] ABSTRACT

A pump assembly includes a pump head that is coupled to a permanent magnet rotor. The rotor is enclosed in a cavity defined by a fluid-tight cup that has an open first end and a closed second end. This cavity is in fluid connection with the pump head through its open first end. Outside the cup enclosure are disposed a plurality of electrical stator windings. A housing encloses all of the foregoing elements, and may also enclose a circuit board that includes circuitry for driving the stator windings. The pump assembly thereby provided is compact, efficient, and reliable.

5 Claims, 6 Drawing Sheets

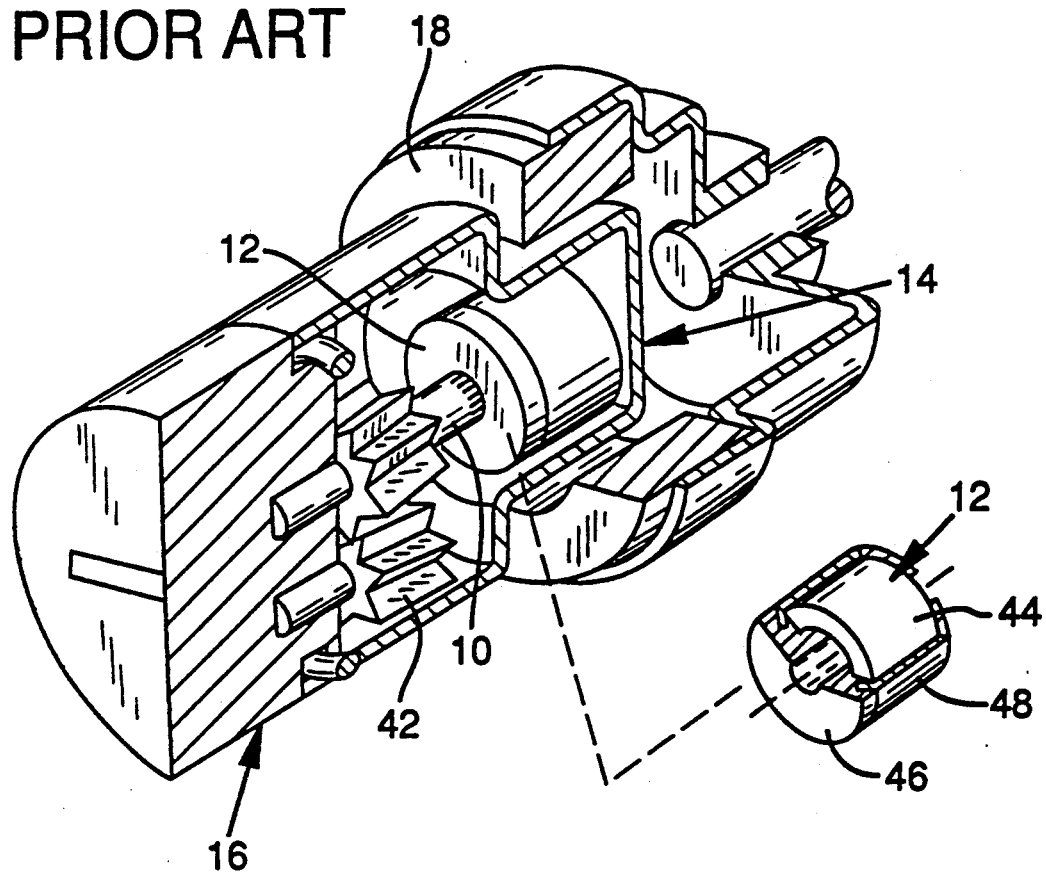

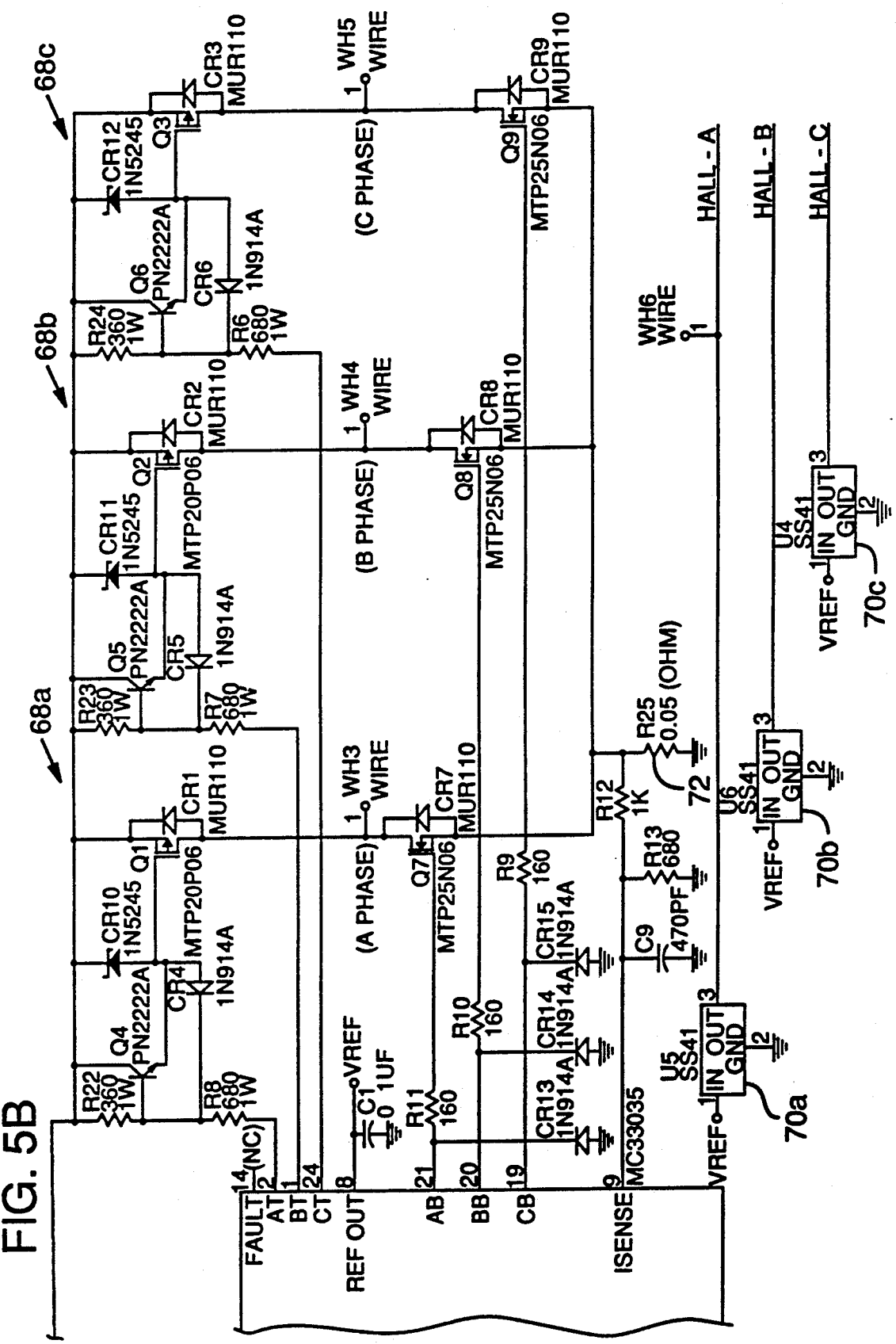

PUMP ASSEMBLY WITH INTEGRAL ELECTRONICALLY COMMUTATED DRIVE SYSTEM

FIELD OF THE INVENTION

The present invention relates to pump drive systems, and more particularly relates to pump drive systems in which the torque used to power the pump is transmitted magnetically across a statically sealed interface.

BACKGROUND AND SUMMARY OF THE INVENTION

A multitude of pump constructions are known. For expository convenience, the present invention is illustrated with reference to a small (i.e. less than 200 G.P.H.) gear pump. It will be recognized, however, that the principles of the invention are equally applicable to a variety of different pump and other systems.

Gear pumps are conventionally housed in sealed enclosures from which the pump drive shaft extends. A drive motor is then coupled to the shaft to drive the pump head.

In such "direct drive" systems, dynamic bearing seals are required on the drive shaft to prevent fluid leaks. This seal presents a number of problems. Primary among these is the difficulty of maintaining a leak-free seal without imposing excessive frictional loading, which decreases pump efficiency and increases heat losses. Related problems include decreased reliability, decreased pump lifetime, and contamination due to seal failures.

To overcome these problems, U.S. Pat. Nos. 3,238,883 and 4,111,614 teach the use of a magnet drive system wherein a drive shaft needn't extend through the pump housing. Instead, as shown in FIGS. 1 and 2, the drive shaft 10 has mounted thereon a magnet 12 that is enclosed within a fluid-tight cylindrical extension 14 of the pump housing 16. Outside this portion of the housing is disposed a cylindrical driving magnet 18 that is magnetically coupled to the magnet inside the housing. By rotating the external cylindrical magnet 18, the magnet 12 on the drive shaft inside the housing, and thus the drive shaft 10, are caused to rotate.

While the foregoing magnet drive system eliminates the need for a dynamic shaft bearing seal, it still requires a motor 20 to drive the outside magnet. Motors typically include a pair of motor bearings 22 (FIG. 2) in which the motor shaft 24 is journalled for rotation. Such bearings are prone to failure, reducing the reliability of the associated pump. The bearings also introduce friction, which decreases efficiency and increases heat losses. These problems are common to any system employing a drive motor, including the direct drive systems discussed above.

A second problem common to both direct and magnet drive systems is the use of brushed motors. In such motors, electrically conductive "brushes" are spring biased against the rotor shaft to make electrical connections with windings mounted thereon. Due to their reliance on an electromechanical contact against a moving element, motor brushes are prone to intermittent contacts and ultimately failure.

A third problem common to both the direct and magnet drive systems is the space that the motor requires. Pump assemblies are often the largest components in the apparatuses in which they are used. Of this size, the pump drive motor generally contributes more than half.

If the size of the composite pump head/motor/controller assembly could be reduced, significant economies of space, and consequently of money, could be achieved in the apparatuses in which pumps are employed.

From the foregoing it will be recognized that there is a need for a compact pump assembly that operates without motor shaft bearings or shaft seals.

In accordance with the present invention, the foregoing need is fulfilled by integrally incorporating a motor as part of the pump assembly. By so doing, the motor shaft bearings and seals can be eliminated, and a compact pump assembly can be provided.

In more detail, a pump according to the present invention includes a rotary drive shaft which, at one end, is connected to the pump head and, at the other end, is connected to a permanent magnet rotor. This shaft and rotor are enclosed in a cavity defined by a fluid-tight cup that has an open first end and a closed second end. The cavity in which the rotor rotates is in fluid connection with the pump head through its open first end. Outside the cup enclosure are disposed a plurality of electrical stator windings. A housing encloses all of the foregoing elements, and may further enclose a circuit board that includes controller/driver circuitry for controlling operation of the motor and driving the stator windings. The circuit board also desirably includes circuitry for sensing the speed at which the motor is operating, and for adjusting the drive currents applied to the stator windings in response thereto. This feedback provides a "stiff" motor, highly immune to changing load conditions.

By the foregoing construction, a highly compact, efficient, and reliable pump is provided.

The foregoing and additional features and advantages of the present invention will be more readily apparent from the following detailed description thereof, which proceeds with reference to the accompanying drawings.

BRIEF DESCRIPTION OF THE DRAWINGS

FIG. 1 is a fragmentary isometric view of a prior art magnet drive system for a gear pump or the like.

FIGS. 5A and 5B show a schematic diagram of circuitry used to control the drive system of FIG. 3.

DETAILED DESCRIPTION

Figure 3:
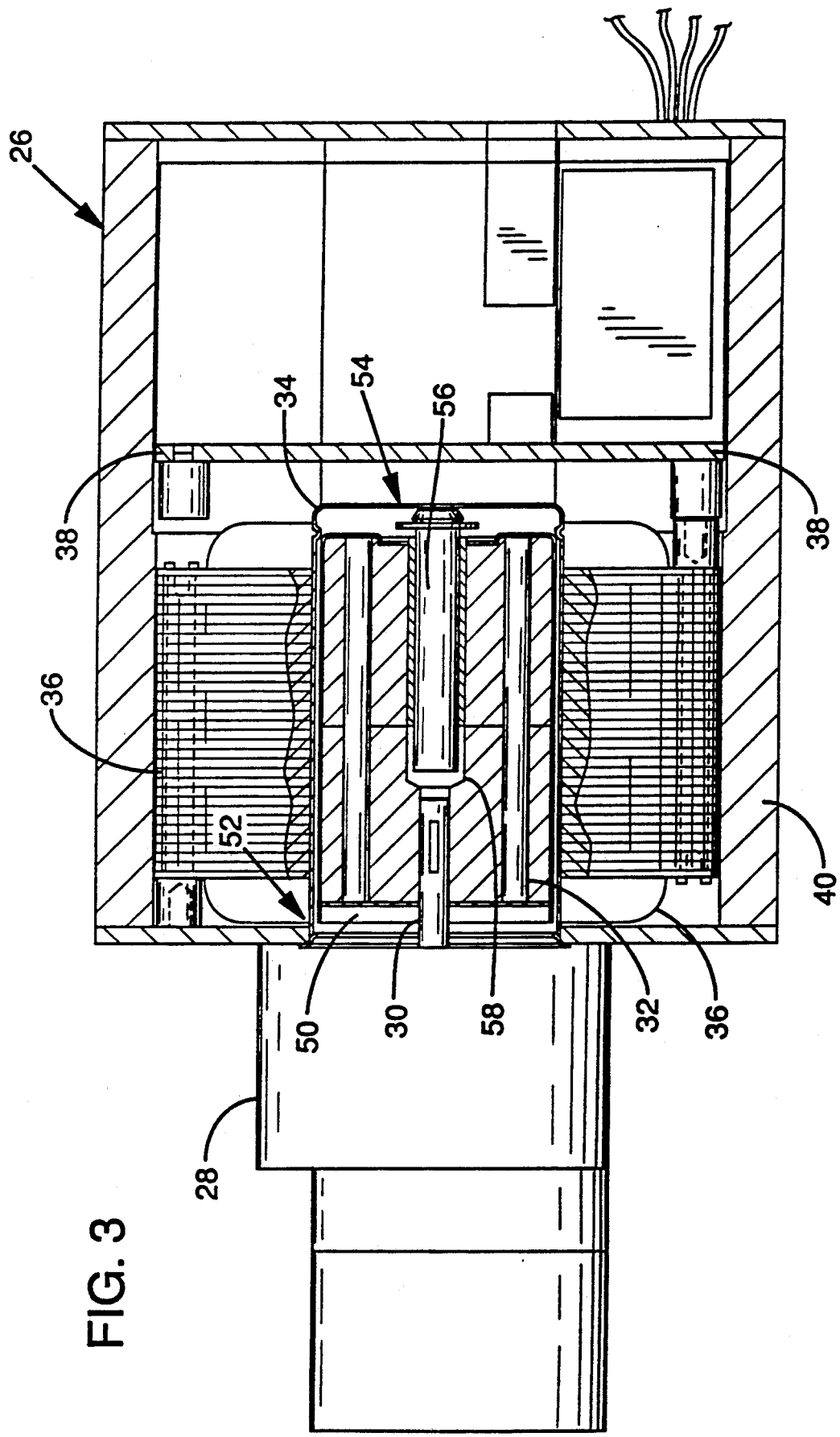
FIG. 3 is a sectional view of a drive system according to one embodiment of the present invention.
Figure 4:
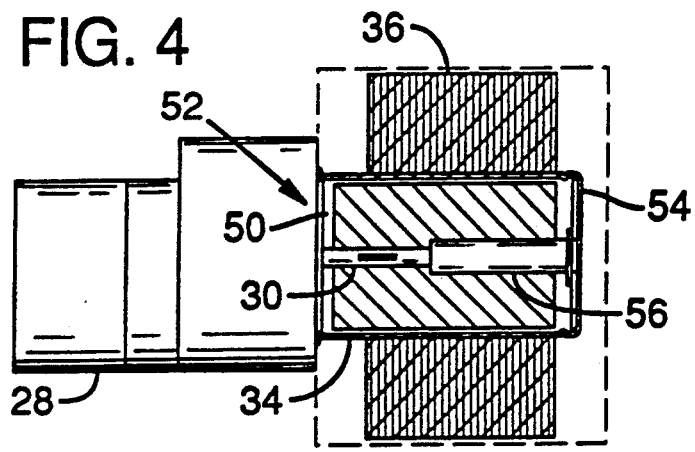
FIG. 4 is a simplified sectional view of a drive system according to a second embodiment of the present invention.

Referring to FIGS. 3 and 4, a pump assembly 26 according to one embodiment of the present invention includes a pump head 28, a rotary drive shaft 30, a permanent magnet rotor 32, a cup enclosure 34, a plurality of electrical stator windings 36, a control circuit board 38, and a housing 40.

The pump head 28 is conventional and may comprise, for example, a gear pump. By rotating the drive shaft 30 associated therewith, the gears 42 (FIG. 1) are caused to rotate and pump fluid from an inlet port to an outlet port.

The permanent magnet rotor 32 is attached to the opposite end of the drive shaft 30. The rotor may be of the type illustrated in U.S. Pat. Nos. 3,238,883 and 4,111,614 and includes a plurality of permanent magnetic dipoles, such as barium ferrite magnets 44 (FIG. 1), radially spaced therearound. The magnet is desirably encapsulated in Ryton or Teflon 46, and then sheathed in stainless steel 48. This jacketing arrangement not only ensures contamination-free operation, but also protects the ceramic magnet from damage caused by thermal shock. In the illustrated embodiment, the rotor and stator are each about 1.5 inches in length (this length is related to the torque that must be generated).

The drive shaft 30 and rotor 32 are disposed within a cylindrical cavity 50 formed by the cup enclosure 34. This enclosure is open at a first end 52, where it adjoins the pump head 28, and is closed at its second end 54. The open first end provides free fluid communication between the pump head 28, the shaft 30, and the rotor 32. The cup enclosure 34 is otherwise fluid-tight. The clearance between the rotor 32 and the inside of the cup is quite small—on the order of 0.015 inch. In the FIG. 3 embodiment, the cup enclosure 34 has a uniform wall thickness along both its cylindrical side wall and its closed end wall.

Extending a short distance into the cavity 50 from the second end 54 of the cup enclosure 34 in the preferred embodiment is a fixed post 56 oriented colinearly with the pump drive shaft 30. The rotor 32 desirably has a bore 58 extending partially therethrough by which the rotor can be constrained to rotate on the post 56. While not necessary, this arrangement minimizes eccentric movement of the rotor as it rotates.

Disposed about the outside of the cup enclosure 34 are a plurality of electrical coils 36 that serve as stator windings. Pulses of current are controllably applied to these windings to produce a rotating magnetic field. This field, in turn, causes the permanent magnet rotor 32 to rotate within the cup enclosure 34, thereby driving the gear pump 28.

In the preferred embodiment, there are desirably an even number of stator windings 36, such as six. This arrangement prevents asymmetrical side loading of the rotor 32. The windings also preferably number more than two in order to provide unambiguous control of the rotor's direction of rotation.

The rotor is desirably provided with a number of poles different than that of the stator. In the illustrated embodiment, the rotor has four poles. This asymmetry insures that the rotor and stator poles cannot all be in alignment.

The circuitry 60 that controls excitation of the stator windings 36 is disposed on a circuit board 38 positioned adjacent the closed, second end 54 of the cup enclosure 34. Desirably, all of the foregoing components are encased in the exterior housing 40, thereby providing a compact unit—about half the size of prior art pump/motor combinations. (In other embodiments, of course, the controller/driver circuitry need not be positioned within the exterior housing but can be at a location remote from the pump head/motor assembly and connected thereto by appropriate wiring.

Figure 5A:
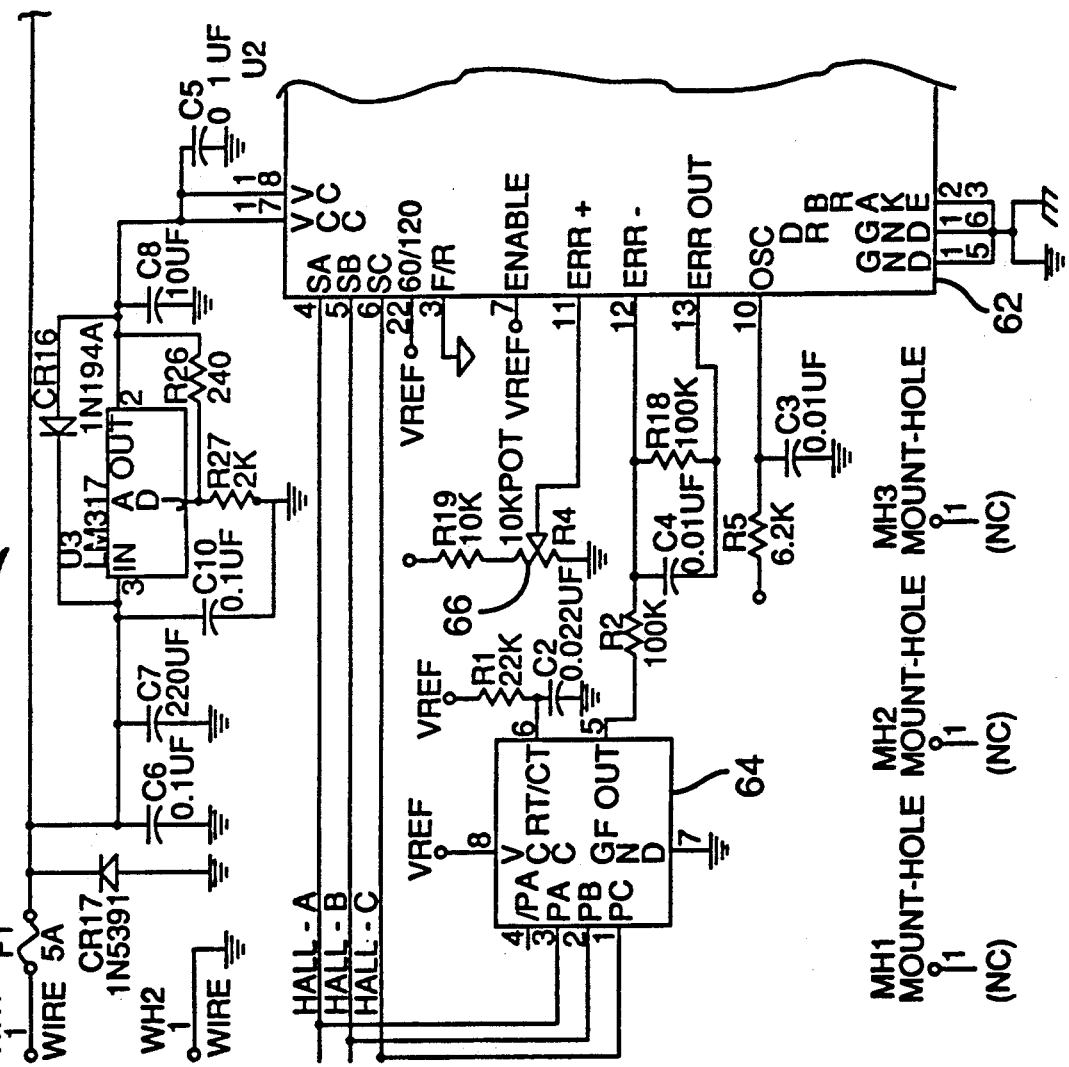

The control circuitry 60 that controls excitation of the stator windings 36 is illustrated in FIG. 5 and is built around a Motorola MC33035 brushless DC motor controller integrated circuit 62 and a Motorola MC33039 tachometer integrated circuit 64. These components control operation of three Motorola type MTP20P06 current switching transistors.

The speed of rotor rotation is set by a potentiometer 6 that controls the rate at which output signal pulses are applied to output terminals of the controller circuit 62. These pulses drive three drive circuits 68a, 68b, 68c that in turn apply current pulses to opposing pairs of stator windings.

In other embodiments, the circuitry can be configured so that it is responsive to an externally applied speed control signal. This control signal may take several forms, including variable amplitude voltage or current signals, pulse width modulated signals, digital control signals, etc.

Rotation of the rotor 32 is sensed by three Hall effect sensors 70a, 70b, 70c that each produce a logic "0" output signal when a south magnetic pole passes thereby. The sensors 70 are connected to the circuit board 38 (FIG. 3) adjacent the second end 54 of the cup enclosure 34, thereby permitting them to sense the magnetic field of the stator windings. The signals from these sensors are applied to the tachometer circuit 64, which produces an output signal related to the rotor's rate of rotation. This output signal is applied to an error input of the controller circuit 62 and compared against a signal corresponding to the desired rate of rotation (set by potentiometer 66). Any difference between these signals represents an undesired slowing of the rotor. The circuit 62 responds to this condition by lengthening the duration of the each of the stator drive pulses, thereby more quickly pulling the rotor towards each of the stator poles.

Figure 6:
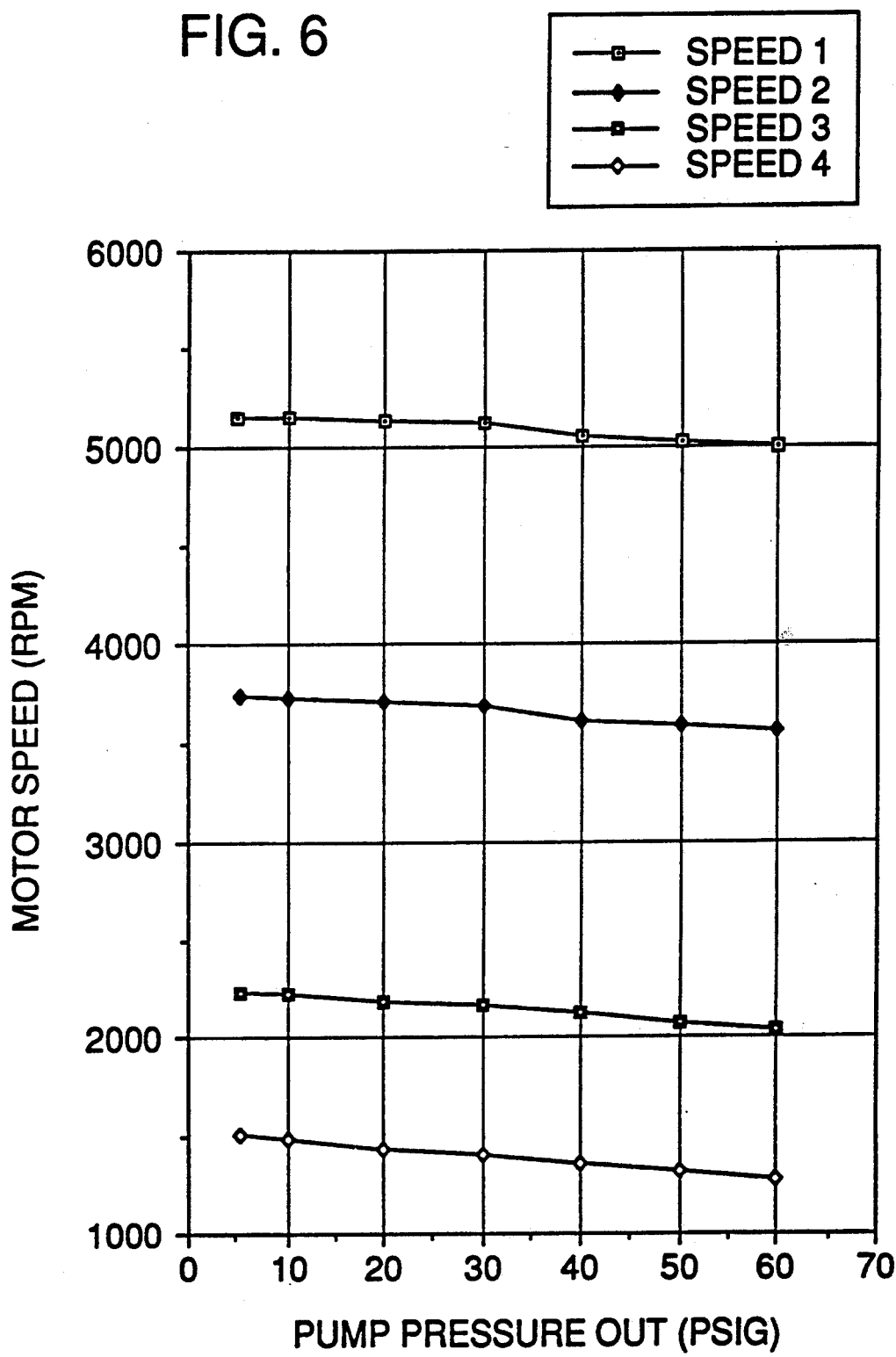
FIG. 6 is a family of curves illustrating performance of a pump employing the drive system of FIG. 3.

This feedback arrangement makes the pump substantially insensitive to changing load (i.e. fluid pressure) conditions. This is best illustrated by the curves of FIG. 6, which show, for example that at high speeds the rotor speed drops only about three percent as fluid pressure increases one thousand percent.

To prevent excessive torque from being applied to the pump's gears 42, the current through the stator windings 36 is monitored. If this current reaches a predetermined value (as detected by the voltage drop across a sense resistor 72), the circuit 62 prevents further increases in stator current. By this arrangement, the gears and bearings of pump 28 are protected from damage from unexpected load conditions.

In high torque applications, the currents provided to the stator windings are normally relatively high. To prevent thermal damage to the circuit board 38 components in these instances, the circuit board is desirably coupled to the exterior housing 40 by a thermally conductive gel or the like. Such a material can fill the cavity in which the printed circuit board is mounted.

Figure 7:
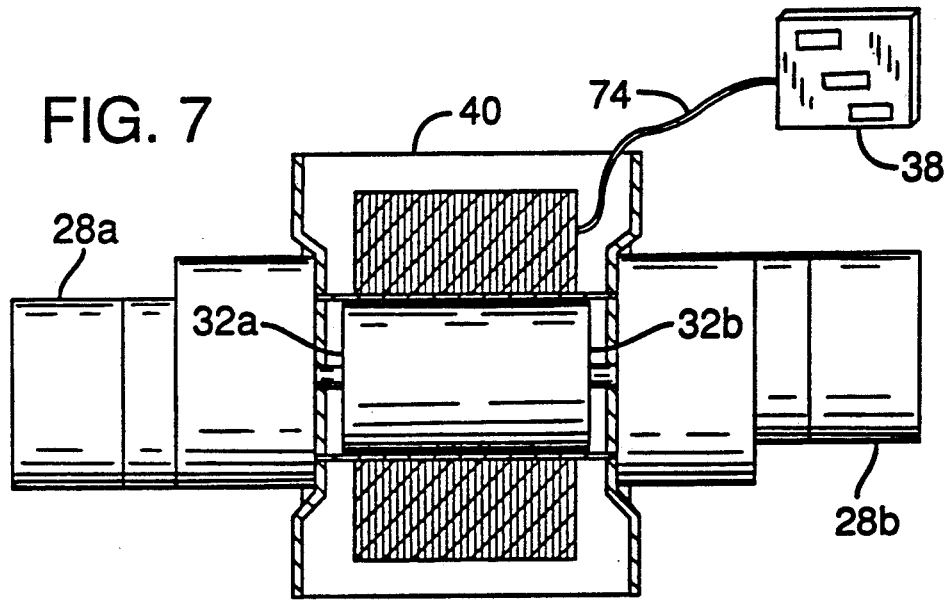
FIG. 7 illustrates an alternative form of the invention in which a single rotor and a single controller are used to drive a pair of pump heads.
Figure 2:
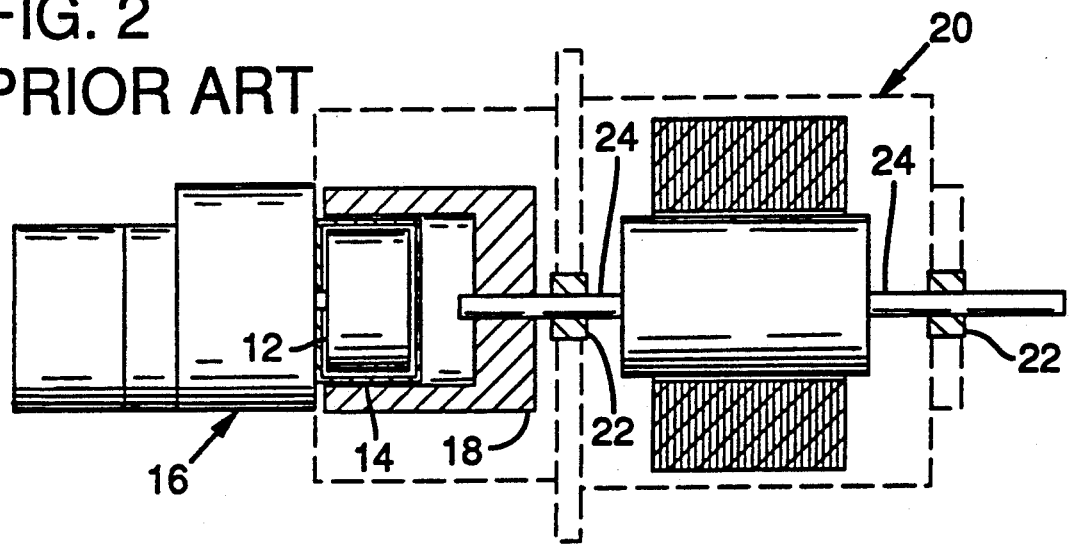
FIG. 2 is a side view of the prior art gear pump and drive system of FIG. 1.

FIG. 7 shows an alternative embodiment of the present invention in which two pump heads 28a, 28b are driven by two rotors 32a and 32b through a single, common stator. The circuit board 38 in this embodiment is positioned externally of the enclosure 40 and is connected to the common stator by a wiring harness 74. If it is not necessary to isolate fluid in one pump head from that in another, a single rotor 32 can be used.

Having described and illustrated the principles of our invention with reference to a preferred embodiment, it will be recognized that the invention can be modified in arrangement and detail without departing from such principles. For example, while the invention has been illustrated with reference to a pump employing a drive shaft, it will be recognized that in alternative embodiments no drive shaft may be required. In some pump constructions, for example, the rotor is directly spline-coupled to the gears without use of an intervening shaft. Similarly, while the invention has been illustrated with reference to a pump employing a permanent magnet rotor, it will be recognized that other types of rotors can be employed. In some applications, the stator may be coaxially positioned inside a rotor, which is designed to rotate thereabout. Finally, while the invention has been illustrated with reference to a gear pump, it will be recognized that the invention can be applied to any shaft drive system, whether in a pump or not, in which efficiency and reliability may be improved by eliminating shaft seals and bearings. Marine propulsion systems are but one example of another field to which the principles of the present invention can be applied.

In view of the many possible embodiments to which the principles of our invention may be put, it should be recognized that the detailed embodiment is illustrative only and should not be taken as limiting the scope of our invention. Rather, we claim as our invention all such embodiments as may come within the scope and spirit of the following claims and equivalents thereto.

We claim:

1. A pump assembly with an integral electronically commutated drive system, the assembly comprising:
    a gear pump head having a plurality of gears and a rotatable shaft extending axially therefrom, the shaft serving to rotate the plurality of gears, the gears serving to pump a fluid from an inlet port to an outlet port;
    a permanent magnet rotor having an axis of rotation, the rotor being coupled to the shaft of the gear pump head at the rotor's axis of rotation, the rotor providing rotary motion to the pump head gears through the pump head shaft;
    a fluid-tight cup having a cylindrical side wall and a closed end, the cup defining an enclosure having an open first end and a closed second end, said cup enclosure defining a cavity within which the rotor is disposed, said cavity being in fluid connection with the gear pump head through its open first end, said cup having a uniform wall thickness along both its cylindrical side wall and its closed end wall;
    a plurality of electrical stator windings disposed about the outside of the cup enclosure, adjacent thereto;
    a metal housing within which the cup enclosure and the stator windings are disposed; and
    a printed circuit board disposed within the closed housing and having circuitry that is electrically coupled to the electrical stator windings and that is electrically coupled to a plurality of wires that exit the housing for external connection, said circuitry including a plurality of current switching transistors for controlling and driving the electrical windings, the circuit board being disposed within the housing in a plane orthogonal to the shaft of the gear pump head and in a space defined between the second end of the cup enclosure and the housing;
    wherein a high efficiency, compact pump assembly with integrated drive electronics is provided.

2. The pump assembly of claim 1 in which:
    the permanent magnet rotor has first and second ends, the shaft of the gear pump head being connected to the first end of the rotor at the axis of rotation, the second end of the rotor defining an axial bore extending at least partially therethrough;
    the cup enclosure defines a post extending into the cavity from the second end thereof; and
    the cup enclosure defines a post extending into the cavity from the second end thereof; and
    the post and the bore define a bearing at the second end of the rotor about which the rotor can rotate to thereby drive the gears of the pump head.

3. The pump assembly of claim 2 in which the circuitry includes means disposed within the housing for limiting the current drawn by the stator windings to prevent damage to the gears under heavy load conditions.

4. The pump assembly of claim 1 in which the circuitry includes means disposed within the housing for limiting the current drawn by the stator windings to prevent damage to the gears under heavy load conditions.

5. The pump assembly of claim 1 in which a clearance between the rotor and the cylindrical side wall of the cup enclosure is about 0.015 inch.

* * * * *